United States Patent
Yanai et al.

(10) Patent No.: US 6,929,772 B2
(45) Date of Patent: Aug. 16, 2005

(54) MANUFACTURING METHOD OF ITO POWDER WITH TIN DISSOLVED IN INDIUM OXIDE, AND MANUFACTURING METHOD OF ITO TARGET

(75) Inventors: Yoshiro Yanai, Ibaraki (JP); Atsushi Nakamura, Ibaraki (JP)

(73) Assignee: Nikko Materials Co., Ltd., Tokyo (JP)

( * ) Notice: Subject to any disclaimer, the term of this patent is extended or adjusted under 35 U.S.C. 154(b) by 421 days.

(21) Appl. No.: 10/168,198

(22) PCT Filed: Dec. 19, 2001

(86) PCT No.: PCT/JP01/11138

§ 371 (c)(1),
(2), (4) Date: Jun. 17, 2002

(87) PCT Pub. No.: WO02/079092

PCT Pub. Date: Oct. 10, 2002

(65) Prior Publication Data

US 2003/0039607 A1 Feb. 27, 2003

(30) Foreign Application Priority Data

Mar. 28, 2001 (JP) .......................................... 2001-91736

(51) Int. Cl.⁷ ........................ C01G 19/00; C01G 57/00; B28B 1/00
(52) U.S. Cl. ..................... 264/614; 423/594.9; 264/681
(58) Field of Search ........................ 423/594.9; 264/614, 264/681

(56) References Cited

U.S. PATENT DOCUMENTS 5,071,800 A    12/1991   Iwamoto et al. ............. 501/126

6,099,982 A  *  8/2000   Okabe et al. ................ 428/697

FOREIGN PATENT DOCUMENTS

| JP | 61-270201 | 11/1986 |
| JP | 64-087519 | 3/1989 |
| JP | 03-218924 | 9/1991 |
| JP | 07-316803 | 12/1995 |

OTHER PUBLICATIONS

Patent Abstracts of Japan, one page English language Abstract for JP 03–218924, Sep. 1991.

Patent Abstracts of Japan, one page English language Abstract for JP 61–270201, Nov. 1986.

Patent Abstracts of Japan, one page English language Abstract for JP 64–087519, Mar. 1989.

Patent Abstracts of Japan, one page English language Abstract for JP 07–316803, Dec. 1995.

* cited by examiner

*Primary Examiner*—Steven Bos
(74) *Attorney, Agent, or Firm*—Howson and Howson

(57) ABSTRACT

A manufacturing method of ITO powder with tin dissolved in indium oxide, wherein the ITO powder is obtained by performing spray pyrolysis to a mixed solution or slurry of indium nitrate and tin chloride in which the concentration of indium and tin is 3.0 mol/L or more, thereby providing at low costs ITO powder superior in component dispersibility by dissolving tin in indium oxide as well as a precise target superior in uniformity. It is thereby possible to restrain the deterioration of quality or abnormal protrusions such as nodules in cases where the ITO sputtering target deposition is not uniform.

18 Claims, 6 Drawing Sheets

A. In x1000

B. Sn x1000

A. In x1000

B. Sn x1000

A. In x1000

B. Sn x1000

MANUFACTURING METHOD OF ITO POWDER WITH TIN DISSOLVED IN INDIUM OXIDE, AND MANUFACTURING METHOD OF ITO TARGET

FIELD OF THE INVENTION

The present invention relates to the manufacturing method of ITO powder with tin dissolved in indium oxide used for forming an ITO film (tin oxide—indium oxide), and to the manufacturing method of an ITO target.

BACKGROUND OF THE INVENTION

An ITO film is widely used as a transparent electrode (film) of a display device; mainly a liquid crystal display. As a method of forming this ITO film, ordinarily employed is a method generally referred to as a physical vapor deposition method such as the vacuum deposition method or sputtering method. Particularly, the magnetron sputtering method is often employed for forming such ITO film from the perspective of operability and stability of the film.

The formation of film with the sputtering method is performed by physically colliding a positive ion such as Ar ion to a target established in the negative electrode, discharging materials composing the target with such collision energy, and laminating films of approximately the same composition as the target material on the substrate on the opposing positive electrode side.

The coating method employing the sputtering method is characterized in that it is capable of forming a thin film of angstrom units to a thick film of several ten μm at a stable deposition speed by adjusting the processing time, power supply, and so on.

A particular problem in forming an ITO film is the sputtering target density and generation of nodules during the sputtering operation. The sputtering target for forming the ITO film is prepared by sintering the powder in which tin oxide powder and indium oxide powder are mixed at a prescribed ratio. Nevertheless, since this powder is of originally differing components and composition, the grain diameter of such powder will vary, and it is inevitable that this powder will tend to be inferior at the stage of mixing in comparison to powders having the same component.

Nonetheless, since recent electronic devices are being further downsized and miniaturized, the transparent conductive film itself is being thinly miniaturized, and, if such film is not formed uniformly, there is a trend of the influence on the deterioration of quality becoming great.

In consideration of the above, as a result of examining the pores inside the sintered body, it has become evident that tin oxide is segregated on the inner walls of the pores and the periphery thereof. And, one factor of such segregation being generated is that tin oxide, which is the ITO material, was aggregated.

Therefore, the improvement in the dispersibility of tin will lead to the reduction of pores, and it is anticipated that the effective manufacture of ITO sintered body targets with few generation of nodules will become possible.

From this perspective, for the purpose of improving the dispersion status of tin, considered may be a method of premixing indium salt and tin salt, adding a precipitant to this mixed solution, simultaneously obtaining mixed sediments (coprecipitation method) via the neutralization process of indium hydroxide and metastannate, and drying, washing, sintering (oxidizing) this to obtain a mixed powder of indium oxide and tin oxide.

Although this coprecipitation method, which is considered to improve the dispersibility most efficiently, certainly makes the dispersibility of tin favorable, there is a problem in that the production cost will increase since there are numerous processes in comparison to ordinary manufacturing methods.

When the number of nodules on the erosion face of the ITO target becomes large, this induces irregular sputtering, and, in some cases, there is a problem in that an abnormal discharge or clustered (solidified) film will be formed, which may become a factor of a short circuit.

Simultaneously, oversized grains (particles) may float inside the sputtering chamber, and there is a problem in that this may similarly cause a short circuit in the thin film circuit by re-attaching on the substrate and cause protrusions on the thin film.

Accordingly, although it was necessary to obtain a high-density sintered body target having uniform components, there was a problem in that a manufacturing method of ITO powder and a manufacturing method of an ITO target capable of satisfying these requirements and enabling low manufacturing costs could not be obtained.

OBJECTS OF THE INVENTION

The present invention was devised in order to solve the various aforementioned problems, and, in particular, an object thereof is to provide a manufacturing method of ITO powder and a manufacturing method of an ITO target capable of obtaining a sintered body superior in component uniformity and favorable in forming ITO thin films by increasing the dispersibility of tin and thereby reducing pores. It is thereby possible to provide at low costs ITO film forming powder and tin oxide—indium oxide target capable of restraining the deterioration of quality or abnormal protrusions such as nodules in cases where the ITO sputtering target deposition in not uniform.

SUMMARY OF THE INVENTION

In order to overcome the foregoing problems, splay pyrolysis is used as the technical means, and ITO powder with tin dissolved in indium oxide is manufactured thereby, and an ITO target is also manufactured as a result thereof. Thereby obtained was a discovery that ITO powder and target suitable for ITO transparent conductive films or the like could be obtained.

Based on the foregoing discovery, the present invention provides a method of manufacturing ITO powder with tin dissolved in indium oxide, wherein the ITO powder obtained by performing spray pyrolysis to a mixed solution or slurry of indium nitrate and tin chloride in which the concentration of indium and tin is 3.0 mol/L or more, or 4.0 mol/L or more. Preferably the powder is powder in which tin is supersaturatedly dissolved in indium oxide. The present invention also provides a method of manufacturing an ITO target wherein the ITO target is obtained by preparing ITO powder upon performing spray pyrolysis to a mixed solution or slurry of indium nitrate and tin chloride, recovering the ITO powder with tin dissolved in indium oxide pursuant to a filter or cyclone, and thereafter molding and sintering the ITO powder. The concentration of indium and tin in the mixed solution or slurry of indium nitrate and tin chloride is 3.0 mol/L or more, or 4.0 mol/L or more. Preferably, the powder is powder in which tin is supersaturatedly dissolved in indium oxide.

DETAILED DESCRIPTION OF THE PREFERRED EMBODIMENTS

Figure 1:
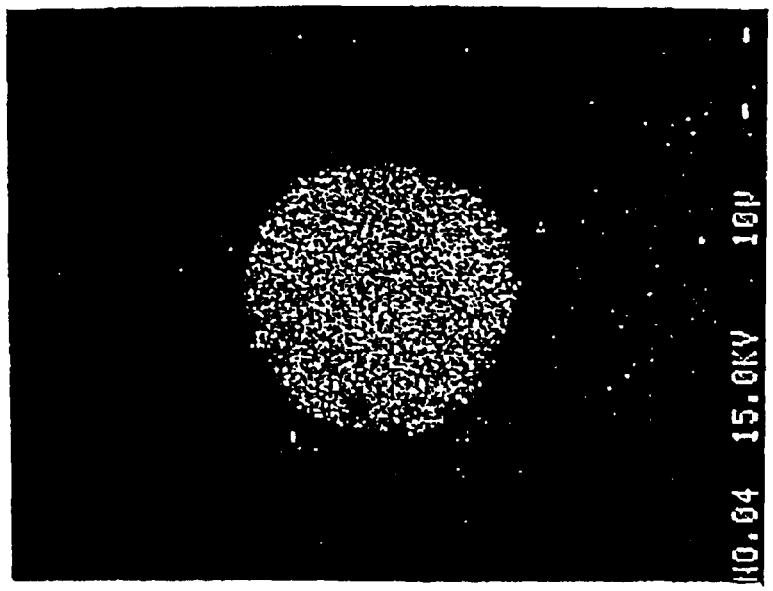
FIG. 1 are images showing the EPMA observation results of pulverulent bodies in which the ITO powder of Example 1 was granulized.
Figure 1:
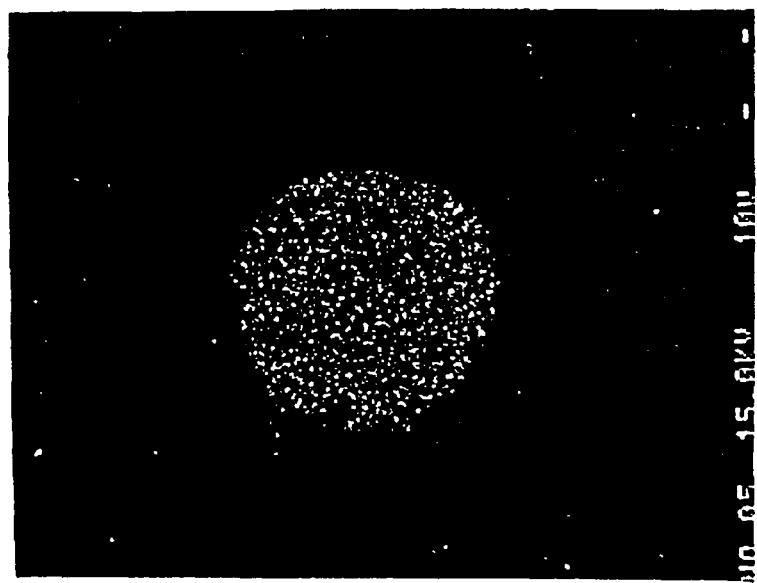

It is not as though there was no technology in the past for manufacturing indium oxide—tin oxide powder pursuant to spray pyrolysis (for example, Japanese Patent Laid-Open Publication No. S64-87519). Nevertheless, this was not manufactured for forming an ITO film with sputtering, and manufactured for forming a transparent conductive film by applying ITO fine powder.

Therefore, as a specific example, spray pyrolysis is performed with indium nitride and tin sulfate, and, here, the mixed solution to be used in the atomization is approximately 0.01 to several mol/L, preferably 0.5 to 2 mol/L. And, when it is too dense, it is recognized that fine powder cannot be obtained. This coincides with the technical concept in that sulfate, which does not dissolve easily, is used upon dissolving tin.

Moreover, this technology is extremely inefficient in that pulverulent bodies of pyrolysis gas containing vapor are recovered with a water scrubber, the ITO pulverulent bodies recovered in the water are left still for three (3) days thereafter, and decantation and centrifugation are performed thereto for the recovery.

Contrarily, with the present invention, ITO powder is obtained by performing spray pyrolysis to a mixed solution or slurry of indium nitrate and tin chloride prepared such that the concentration of indium and tin is 3.0 mol/L, and preferably 4.0 mol/L, wherein tin is dissolved, particularly supersaturatedly dissolved, in indium oxide.

Pyrolysis may be performed by employing a furnace which applies heat with a flame method of direct atomization in the flame or an indirect method of electric heating. Pyrolysis can be suitably adjusted within a temperature range of 800° C. to 1200° C. for such heating.

A favorable sintered body ITO target cannot be manufactured when the concentration of indium and tin in the mixed solution of indium nitrate and tin chloride is less than 3 mol/L.

Preferably, dissolved (supersaturated) powder is obtained by employing a mixed solution or slurry of 4 mol/L or more.

A precise sintered body ITO target superior in uniformity favorable in ITO deposition can thereby be manufactured.

Further, when employing a slurry of indium nitrate and tin chloride, although the liquidity will deteriorate, there is no particular problem so as long as it will not hinder the atomization of such slurry to the spray pyrolysis device. From this perspective, it is desirable that the upper limit on the concentration of indium and tin be approximately 8.0 mol/L.

The ITO powder with tin dissolved in indium oxide obtained by performing spray pyrolysis to the mixed solution of indium nitrate and tin chloride is recovered physically or mechanically with a back filter, stainless filter or cyclone.

Accordingly, processes such as wet-process decantation are no longer necessary, and the ITO powder prepared by spray pyrolysis can be used as is. In other words, after recovering the ITO powder with tin dissolved (supersaturated) in indium oxide, an ITO target is directly manufactured by molding and sintering such recovered ITO powder.

EXAMPLES COMPARATIVE EXAMPLES

Examples of the present invention are now described. Further, these Examples are mere exemplifications, and the present invention is not in any way limited thereby. In other words, the present invention covers modes and modifications other than these Examples based on the technical spirit of the invention.

Example 1

A solution in which indium metal was dissolved in a concentrated nitric acid solution (60%) and a solution in which tin metal was dissolved in hydrochloric acid (32%) were mixed such that the weight ratio of $In_2O_3:SnO_2$ after spray pyrolysis becomes 9:1. Moreover, here, the concentration of indium+tin was made to be 4.64 mol/L in the solution.

Next, this mixed solution was atomized and pyrolyzed with a binary fluid nozzle in a mullite core tube heated to 1000° C. The atomization pressure was set to 0.2 Mpa, nozzle airflow rate to 25 $m^3$/min, carrier airflow rate to 20 $m^3$/min, and concentrate solution atomization amount to 1.6 kg/h. The produced ITO powder was recovered with a bag filter, and the pyrolyzed gas was recovered with a scrubber. The bag filter temperature was set to 180° C.

The obtained ITO powder had a specific surface area of 9.74 $m^2$/g, a median size (D50) of 9.64 $\mu$m, and a bulk density of 0.34 g/cc.

Moreover, only $In_2O_3$ was observed with the XRD measurement of ITO powder.

Example 2

A solution in which indium metal was dissolved in a concentrated nitric acid solution (60%) and a metastannate slurry obtained by dissolving tin metal in hydrochloric acid (60%) were mixed such that the weight ratio of $In_2O_3:SnO_2$ after spray pyrolysis becomes 9:1. Moreover, here, the concentration of indium+tin was made to be 3.32 mol/L slurry.

Next, this slurry was atomized and pyrolyzed under the same conditions as Example 1. The produced ITO powder was recovered with a bag filter, and the pyrolyzed gas was recovered with a scrubber. The bag filter temperature was set to 180° C.

The obtained ITO powder had a specific surface area of 10.03 $m^2$/g, a median size (D50) of 4.28 $\mu$m, and a bulk density of 0.23 g/cc.

Moreover, only $In_2O_3$ was observed with the XRD measurement of ITO powder.

Comparative Example 1

Indium hydroxide was deposited by electrolyzing a solution in which indium metal was dissolved in a concentrated nitric acid solution (60%). This sediment was recovered with a filter press, washed, and thereafter dried and oxidized with a rotary kiln to obtain indium oxide powder.

Simultaneously, metastannate prepared by dissolving tin metal in a concentrated nitric acid solution (60%) was recovered similarly with a filter press, washed, and thereafter dried and oxidized with a rotary kiln to obtain tin oxide powder.

The indium oxide and tin oxide were check-weighed such that the weight ratio thereof becomes 9:1, then mixed and pulverized with a bead mill to obtain indium oxide—tin oxide mixed (ITO) powder.

The obtained ITO powder had a specific surface area of 7.55 m²/g, a median size (D50) of 1.67 μm, and a bulk density of 0.65 g/cc.

Moreover, $In_2O_3$ and $SnO_2$ were observed with the XRD measurement of ITO powder.

Comparative Example 2

A mixed solution of indium salt and tin salt in which indium oxide and tin oxide were mixed such that the ratio thereof becomes 9:1 and a 25% ammonia aqueous solution were dripped while maintaining the reacting pH at 5.0 in order to obtain a sediment of indium and tin.

This sediment was filtered, and thereafter washed three times with purified water until the pH became 7.0. Next, this sediment was dried at 120° C., and this dried substance was sintered for 40 minutes at 1100° C. while flowing hydrochloric gas of 20 vol %.

The obtained ITO powder had a specific surface area of 3.23 m²/g, a median size (D50) of 3.45 μm, and a bulk density of 0.58 g/cc.

Moreover, $In_2O_3$ and $SnO_2$ were observed with the XRD measurement of ITO powder.

Example 3

A solution in which indium metal was dissolved in a concentrated nitric acid solution (60%) and a solution in which tin metal was dissolved in hydrochloric acid (32%) were mixed such that the weight ratio of $In_2O_3$:$SnO_2$ after spray pyrolysis becomes 9:1. Moreover, here, the concentration of indium+tin was made to be 4.64 mol/L in the solution.

Next, 3 m³/h of butane, which is combustion gas, and 17 m³/h oxygen were injected to form an oxygen burner flame of approximately 3000° C., and ITO atomized powder was prepared by atomizing the foregoing mixed solution (concentrate solution) in this flame.

The flow rate of the concentrate solution to be atomized in the flame was set to 8 kg/h, and oxygen gas was used as the carrier gas of such concentrate solution in order to perform atomization at an atomization pressure of 0.2Mpa and flow rate of 5 m³/min.

The obtained ITO powder had a specific surface area of 1.07 m²/g, a median size (D50) of 0.86 μm, and a bulk density of 0.42 g/cc.

Figure 6:
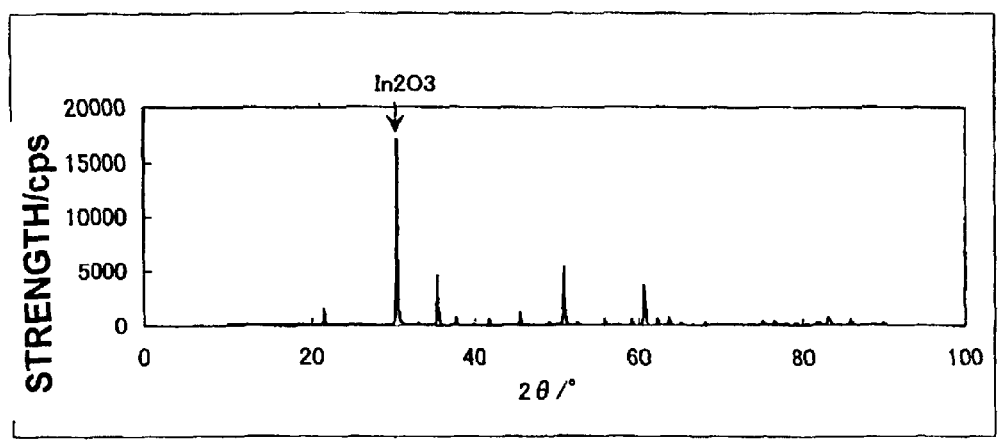
FIG. 6 is a diagram showing the XRD measurement results of the ITO powder of Example 3.

Moreover, as shown in FIG. 6, only $In_2O_3$ was observed with the XRD measurement of ITO powder.

Comparisons of the attributes of the ITO powder obtained in foregoing Examples 1, 2, 3 and Comparative Examples 1, 2 are collectively shown in Table 1.

As shown in Table 1, the ITO powder prepared in aforementioned Example 1 and Example 2 have a large specific surface area in comparison to the pulverulent bodies of Comparative Examples 1, 2, and is an aggregate of minute, uniform particles. The bulk density of the pulverulent bodies is small since the aggregation is comparatively gentle.

Meanwhile, with respect to Example 3, as shown with the SEM observation image below, it has been confirmed that this is a monodispersive pulverulent body having extremely high crystallinity, and that it is also a tin-supersaturated ITO powder of a single phase $In_2O_3$.

TABLE 1

| | Specific Surface Area m³·g⁻¹ | Median Size μm | Bulk Density g/cc | XRD |
|---|---|---|---|---|
| Example 1 | 9.74 | 9.64 | 0.34 | $In_2O_3$ Single Phase |
| Example 2 | 10.03 | 4.28 | 0.23 | $In_2O_3$ Single Phase |
| Comparative Example 1 | 7.55 | 1.67 | 0.65 | $In_2O_3$ + $SnO_2$ |
| Comparative Example 2 | 3.23 | 3.45 | 0.58 | $In_2O_3$ + $SnO_2$ |
| Example 3 | 1.07 | 0.86 | 0.42 | $In_2O_3$ Single Phase |

Figure 2:
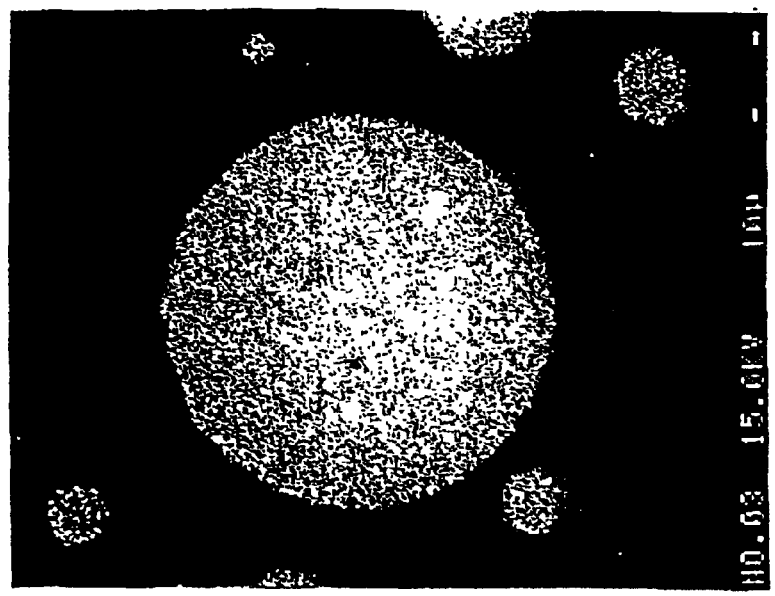
FIG. 2 are images showing the EPMA observation results of pulverulent bodies in which the mixed power of indium oxide and tin oxide of Comparative Example 1 was granulized.
Figure 2:
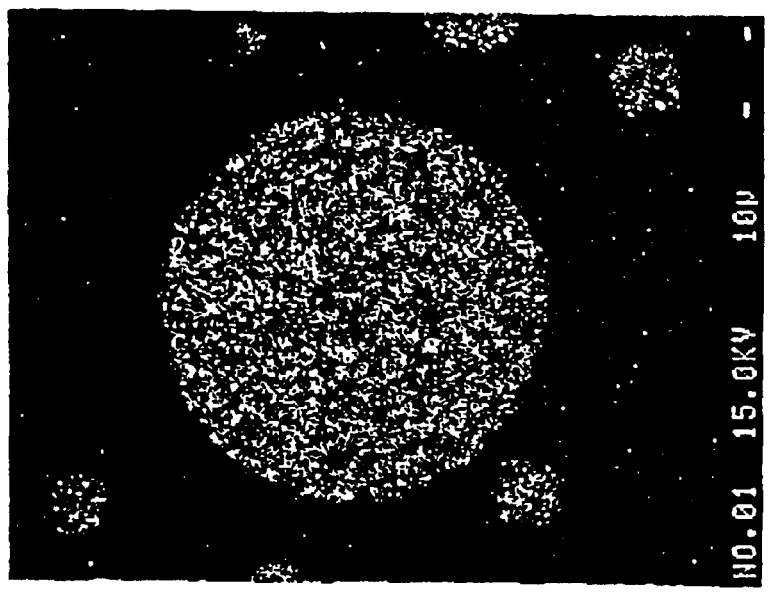

EPMA observation images of pulverulent bodies in which the ITO powder of Example 1 was granulized are shown in FIG. 1(A, B); EPMA observation images of pulverulent bodies in which the mixed power of indium oxide and tin oxide of Comparative Example 1 was granulized are shown in FIG. 2(A, B); and EPMA observation images of pulverulent bodies in which the coprecipitated ITO powder of Comparative Example 2 was granulized are shown in FIG. 3(A, B), respectively.

It has been observed that tin is dispersed uniformly in Example 1 shown in FIG. 1(A). Although not shown, similar results were obtained in Example 2 as those shown in FIG. 1.

Contrarily, it has been observed that tin is partially segregated in the Comparative Example of FIG. 2(A). It is thereby possible to confirm that the spray pyrolysis of the present Examples improves the dispersibility of tin in comparison to Comparative Example 1.

Figure 3:
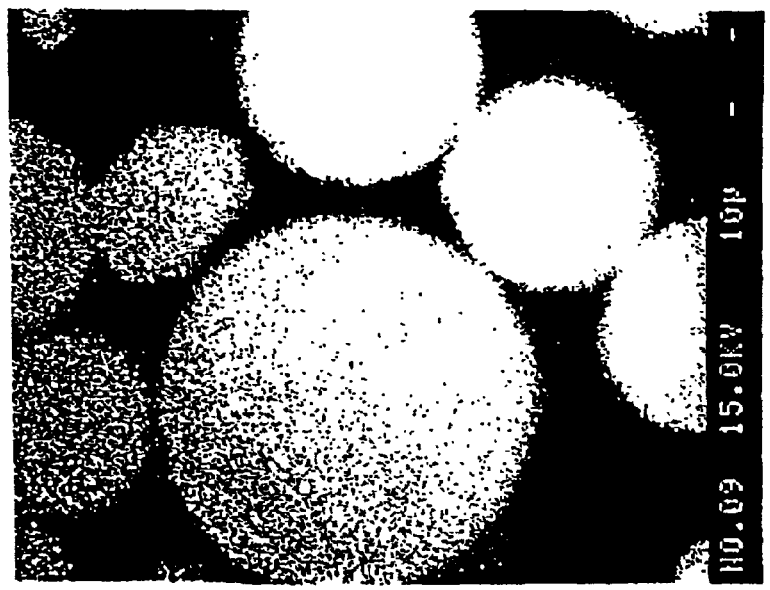
FIG. 3 are images showing the EPMA observation results of pulverulent bodies in which the coprecipitated ITO powder of Comparative Example 2 was granulized.
Figure 3:
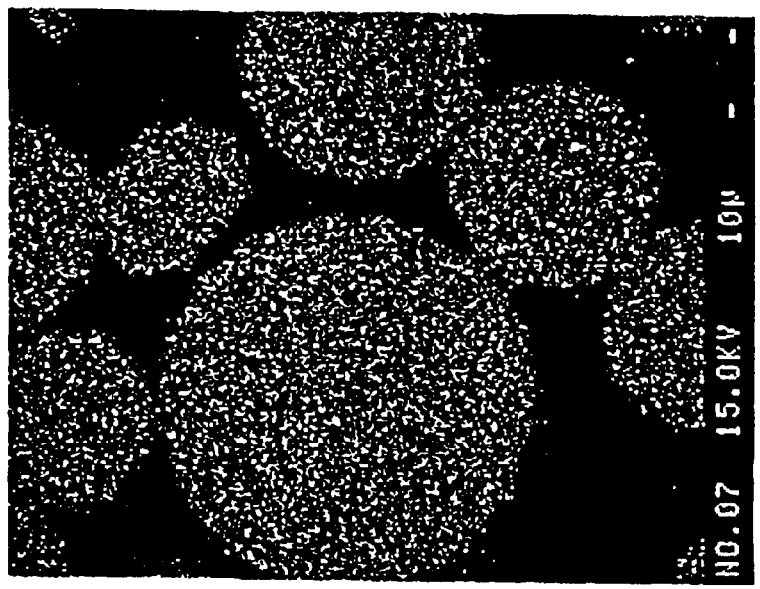

Further, in the EPMA observation of FIG. 3, obtained were results in which the dispersibility of tin appears to be the same as the spray pyrolysis shown in FIG. 1.

Figure 4:
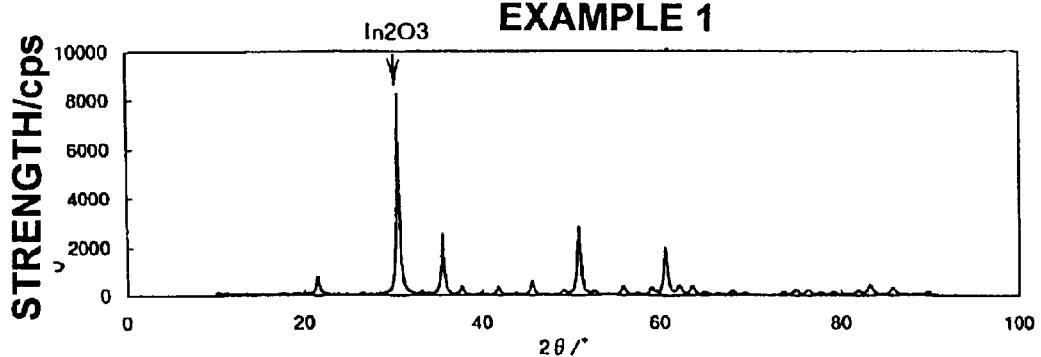
FIG. 4 are diagrams showing the XRD measurement results of the respective pulverulent bodies of Examples 1, 2 and Comparative Examples 1, 2.
Figure 4:
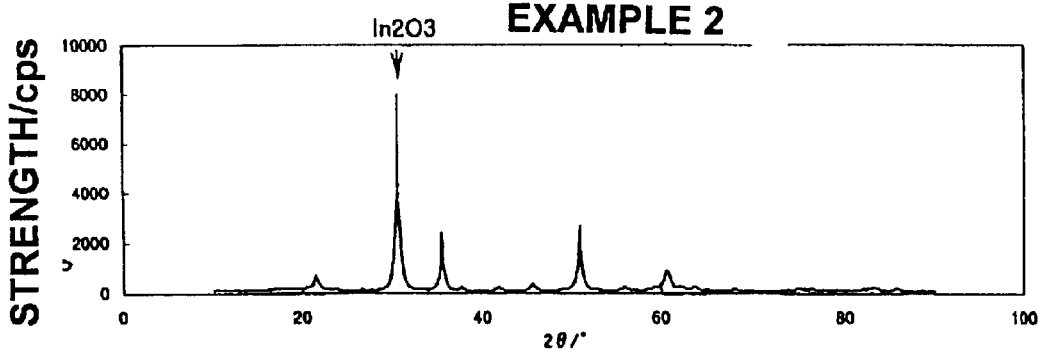
Figure 4:
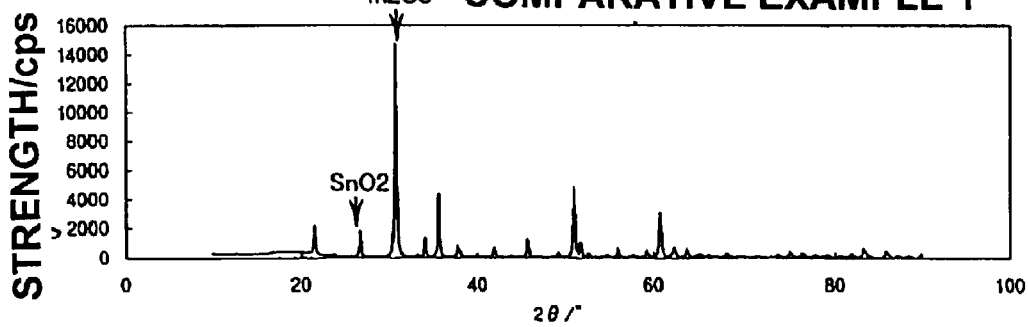
Figure 4:
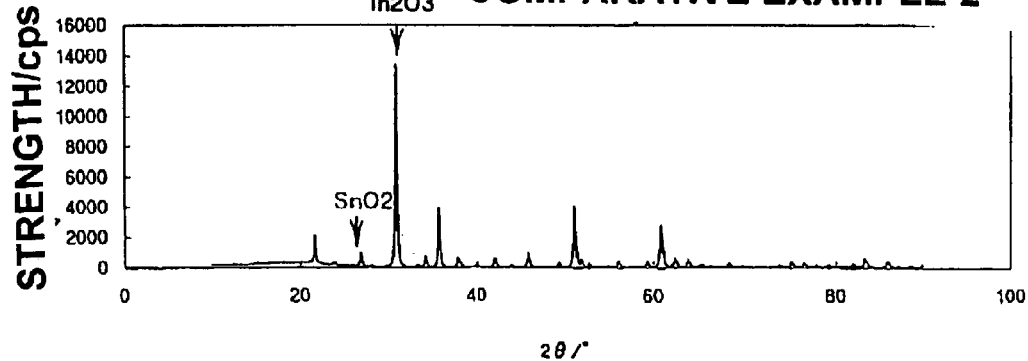

The XRD measurement results of Examples 1, 2 and Comparative Examples 1, 2 are shown in FIG. 4. The upper graph in FIG. 4 shows the XRD measurement results of ITO powder of Examples 1, 2, and the lower graph shows the XRD measurement results of ITO powder of Comparative Examples 1, 2.

As shown in FIG. 4, although the peak of $SnO_2$ of the pulverulent bodies of Comparative Examples 1, 2 can be observed at around 26.5 degrees, this peak does not appear in Examples 1, 2, and it is evident that $SnO_2$ is dissolved in $In_2O_3$.

Thereby, with the ITO powder of Examples 1, 2, tin is dissolved in the indium oxide matrix, and it is evident that the improvement in the dispersibility of tin is pursuant to the dissolution of tin.

As described above, with the EPMA observation in the coprecipitated powder of Example 2, although the dispersibility of tin appeared to be the same as spray pyrolysis, it is clear that tin is not dissolved upon viewing this XRD.

Figure 5:
FIG. 5 is an SEM observation image of the ITO powder of Example 3.

Further, FIG. 5 is an SEM observation image of the ITO powder of Example 3, and FIG. 6 is a diagram showing the XRD measurement results of such ITO powder. It is clear from these diagrams that the ITO powder of Example 3 is a tin-supersaturated ITO powder of single phase $In_2O_3$, and that it is a monodispersive pulverulent body with high crystallinity. The dispersibility of tin is thereby significantly improved.

As illustrated in foregoing Examples 1 to 3, it is evident that the spray pyrolysis of the present invention is considerably superior in the dispersibility of tin.

Provided is a manufacturing method of ITO powder suitable in manufacturing an ITO sputtering target by increasing the dispersibility of tin and thereby reducing pores. It is thereby possible to restrain the deterioration of quality or abnormal protrusions such as nodules in cases where the ITO sputtering target deposition is not uniform.

What is claimed is:

1. A manufacturing method of ITO powder, comprising the step of dissolving tin in indium oxide, said tin being dissolved in said indium oxide to obtain the ITO powder by performing spray pyrolysis to a mixed solution of indium nitrate and tin chloride in which a concentration of indium and tin is 3.0 mol/L or more.

2. A manufacturing method according to claim 1, wherein the concentration of indium and tin is 4.0 mol/L or more.

3. A method according to claim 1, wherein said tin is supersaturatedly dissolved in said indium oxide.

4. A method according to claim 2, wherein said tin is supersaturatedly dissolved in said indium oxide.

5. A method according to claim 1, further comprising the step of recovering the ITO powder with a filter or a cyclone.

6. An ITO target manufacturing method, comprising the steps of:

performing spray pyrolysis to a mixture of indium nitrate and tin chloride to produce an ITO powder, recovering the ITO powder with tin dissolved in indium oxide utilizing an apparatus selected from the group consisting of a filter and a cyclone, and thereafter molding and sintering said ITO powder to form an ITO target.

7. An ITO target manufacturing method according to claim 6, wherein a concentration of indium and tin in the mixture of indium nitrate and tin chloride is 3.0 mol/L or more.

8. An ITO target manufacturing method according to claim 6, wherein a concentration of indium and tin in the mixture of indium nitrate and tin chloride is 4.0 mol/L or more.

9. A method according to claim 6, wherein said mixture is a mixed solution of indium nitrate and tin chloride.

10. A method according to claim 6, wherein said mixture is a mixed slurry of indium nitrate and tin chloride.

11. A method according to claim 6, wherein said tin is supersaturatedly dissolved in said indium oxide.

12. A method according to claim 7, wherein said tin is supersaturatedly dissolved in said indium oxide.

13. A method according to claim 8, wherein said tin is supersaturatedly dissolved in said indium oxide.

14. A method of manufacturing ITO powder, comprising the step of dissolving tin in indium oxide, said tin being dissolved in said indium oxide by performing spray pyrolysis to a mixed slurry of indium nitrate and tin chloride in which a concentration of indium and tin is 3.0 mol/L or more.

15. A method according to claim 14, wherein the concentration of indium and tin is 4.0 mol/L or more.

16. A method according to claim 14, wherein said tin is supersaturatedly dissolved in said indium oxide.

17. A method according to claim 15, wherein said tin is supersaturatedly dissolved in said indium oxide.

18. A method according to claim 14, further comprising the step of recovering the ITO powder with a filter or a cyclone.

* * * * *